UNITED STATES PATENT OFFICE.

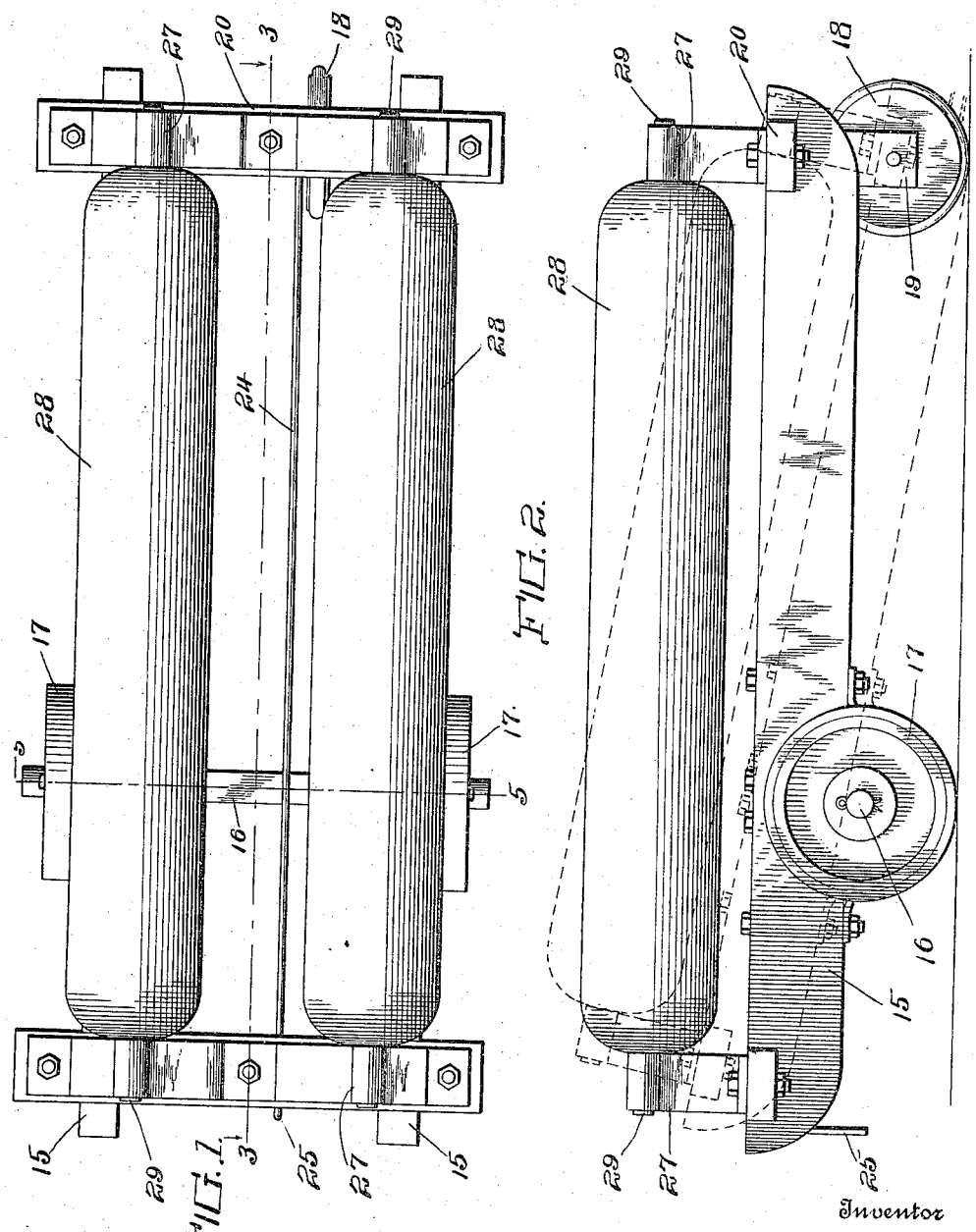

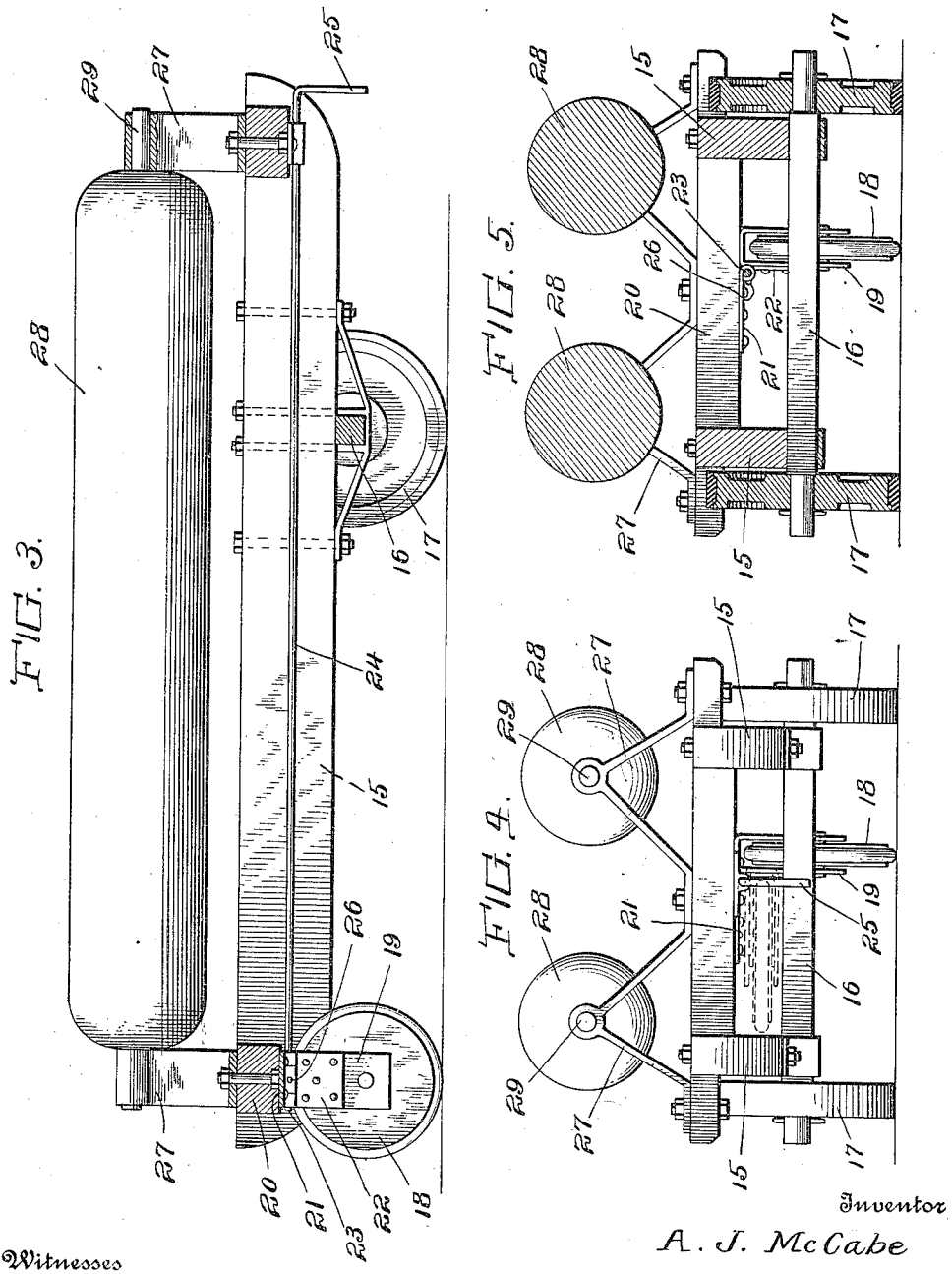

ALLAN JOSEPH McCABE, OF CHARLOTTETOWN, PRINCE EDWARD ISLAND, CANADA.

LINOLEUM-TRUCK.

1,224,759.     Specification of Letters Patent.     Patented May 1, 1917.

Application filed April 8, 1916. Serial No. 89,839.

*To all whom it may concern:*

Be it known that I, ALLAN J. MCCABE, a subject of the King of Great Britain, residing at Charlottetown, in the Province of Prince Edward Island and Dominion of Canada, have invented new and useful Improvements in Linoleum-Trucks, of which the following is a specification.

This invention relates to trucks for handling linoleum, oil cloth, carpets and other like material which is handled in rolls.

One object of the invention is to produce a simple and effective truck having revolving supporting means, such as rollers, on which a roll of linoleum or the like may be supported for the purpose of carrying the same about, for convenience in unrolling and rerolling for exhibition purposes and to facilitate the handling of the material in cutting and matching the same.

A further object of the invention is to produce a simple and effective truck of the character described, the same having a front supporting wheel which may be collapsed against the underside of the platform or frame to enable such frame to be tilted for convenience in loading or unloading the truck.

With these and other ends in view which will readily appear as the nature of the invention is better understood, the same consists in the improved construction and novel arrangement and combination of parts which will be hereinafter fully described and particularly pointed out in the claims.

In the accompanying drawings has been illustrated a simple and preferred form of the invention, it being, however, understood that no limitation is necessarily made to the precise structural details therein exhibited, but that changes, alterations and modifications within the scope of the claims may be resorted to when desired.

In the drawings,—

Figure 1 is a top plan view of a truck constructed in accordance with the invention.

Fig. 2 is a side elevation of the same.

Fig. 3 is a longitudinal sectional view taken on the line 3—3 in Fig. 1.

Fig. 4 is a rear elevation.

Fig. 5 is a transverse sectional view taken on the line 5—5 in Fig. 1.

Corresponding parts in the several figures are denoted by like characters of reference.

The frame structure of the improved device includes sills or side members 15 which are suitably connected and spaced apart, said sills being supported on an axle 16 having rubber tired wheels 17, the treads of which are broad and flat. The axle 16 is preferably located well toward the rearward ends of the sills, the front ends of which are supported by a rubber tired guide wheel 18 mounted for rotation in a fork 19 which is supported by a hinge on the underside of the front cross bar 20 of the frame. The hinge includes a leaf 21 which is secured on the cross bar 20, a second leaf 22 which is secured on the fork 19 and a pintle 23 which is formed by the forward end portion of a rod 24 that extends rearwardly beneath the truck and is provided at its rear end with a handle 25. The pintle 23 is connected with the hinge leaf 22 by a transverse pin 26, so that by turning the rod 24 about its axis, the front fork carrying the front wheel may be swung to an approximately horizontal position beneath the front bar 20, thereby permitting the forward end of the truck frame to be tilted downwardly, as indicated in dotted lines in Fig. 2. The wheel 18 is provided mainly for the purpose of supporting the truck frame in a substantially level position while material is being unrolled and rerolled.

The truck frame is provided adjacent to its front and rear ends with bearings 27 for a pair of longitudinally disposed rollers 28, said rollers having axially disposed spindles 29 that engage the bearings or boxes. The rollers and bearings are so proportioned and arranged that the rollers will be suitably spaced apart and will be arranged in approximately parallel relation to each other. It is also evident that a plurality of relatively short wheels or rollers may be substituted for each of the rollers 28, if preferred.

Rolls of linoleum and similar material are usually stood on end in the warerooms and salesrooms where the material is exhibited for sale. Owing to the heavy weight of these rolls, it is difficult to handle the same and to properly exhibit the material to the best advantage by the means customarily provided. It is also found extremely difficult to handle rolls of heavy material, such as inlaid linoleum, in the process of cutting and matching the same, owing to the fact that the pattern is exposed outward from the roller, and the entire roll must, therefore, be carried bodily while material is being unwound therefrom and laid on the floor of the cutting space until a portion of the desired dimensions has been exposed. By the improved truck of the present invention any roll may be conveniently tilted upon the rollers of the truck, and the material may then be unrolled in such a manner as to exhibit a portion thereof to the best advantage and to dispose the same on the floor of the cutting space, the unrolling and rerolling, as well as the cutting, when necessary, being conveniently performed by the salesman. For convenience in loading or unloading a roll of material, the front end of the truck may be tilted downwardly by first folding the front wheel beneath the front cross bar of the frame. A roll of material loaded on the truck may be quickly and conveniently carried or transported from place to place. The improved truck is simple in construction, is capable of being manufactured at a very moderate expense, and it has been found in actual practice to be thoroughly efficient and useful for the purpose for which it is provided.

Having thus described the invention, what is claimed as new, is:—

1. In a truck for handling linoleum and the like, a frame, longitudinally disposed parallel rollers mounted thereon, an axle on which the frame is tiltably supported, said axle having ground engaging wheels, an auxiliary wheel supporting the front end of the frame, and a longitudinally disposed operating rod for swinging the front wheel upwardly beneath the frame, permitting the forward end of said frame to gravitate downwardly to a load receiving position, the operating rod projecting at the rearward end of the frame.

2. A truck for handling linoleum and the like comprising a frame, longitudinally disposed parallel rollers supported thereon, a wheel carrying axle on which the frame is tiltably supported, a yoke hingedly supported beneath the forward end of the frame, a front wheel journaled in the yoke, and means for swinging the wheel carrying yoke upwardly beneath the forward end of the frame to permit the latter to be tilted to load receiving position, said means including an operating rod connected with the wheel carrying yoke, extending longitudinally of the frame and terminating to the rearward of said frame conveniently accessible to the operator.

3. In a truck of the class described, a frame, a wheel carrying axle supporting the frame, said axle being located well toward the rear end of the frame, a yoke hingedly supported beneath the forward end of the frame, a front wheel journaled in the yoke, and means for swinging the wheel carrying yoke upwardly beneath the forward end of the frame, said means including a rod connected with and extending rearwardly from the pintle of the hinge, a connection between the rod and the wheel carrying yoke, and means for turning the rod about its axis.

In testimony whereof I affix my signature in presence of two witnesses.

ALLAN JOSEPH McCABE.

Witnesses:
L. E. PROWSE,
T. W. L. PROWSE.